(12) United States Patent
Vick

(10) Patent No.: US 9,616,795 B1
(45) Date of Patent: Apr. 11, 2017

(54) UNIVERSAL TAILGATE RAMP ASSEMBLY

(71) Applicant: David A. Vick, Cottage Grove, MN (US)

(72) Inventor: David A. Vick, Cottage Grove, MN (US)

( * ) Notice: Subject to any disclaimer, the term of this patent is extended or adjusted under 35 U.S.C. 154(b) by 0 days.

(21) Appl. No.: 14/748,373

(22) Filed: Jun. 24, 2015

(51) Int. Cl.
*B60P 1/43* (2006.01)
*B62D 33/023* (2006.01)

(52) U.S. Cl.
CPC ............ *B60P 1/435* (2013.01); *B62D 33/023* (2013.01)

(58) Field of Classification Search
CPC .............................. B62D 33/023; B60P 1/435
See application file for complete search history.

(56) References Cited

U.S. PATENT DOCUMENTS

| | | | | |
|---|---|---|---|---|
| 5,993,135 A * | 11/1999 | Wolgamood | ............ | B60P 1/43 296/61 |
| 6,389,629 B1 * | 5/2002 | Schouest | ................. | B60P 1/43 119/849 |
| 6,447,040 B1 * | 9/2002 | Young, Sr. | ............. | B60P 1/435 296/61 |
| 8,668,427 B1 * | 3/2014 | England | .................... | B60P 1/43 414/537 |
| 9,096,397 B2 * | 8/2015 | Brooks | ................ | B65G 69/003 |
| 9,346,390 B1 * | 5/2016 | Croswhite | .............. | B60P 1/435 |
| 9,387,812 B2 * | 7/2016 | Bexar | ...................... | B60R 9/06 |
| 2002/0145300 A1 * | 10/2002 | Webber | ..................... | B60P 1/43 296/61 |
| 2003/0071476 A1 * | 4/2003 | Schilling | ................ | B60P 1/435 296/61 |
| 2003/0072641 A1 * | 4/2003 | Reed | ......................... | B60P 1/43 414/537 |
| 2004/0084925 A1 * | 5/2004 | Ojanen | ................ | B62D 29/008 296/50 |
| 2004/0113449 A1 * | 6/2004 | Hunt | ....................... | B60J 5/108 296/57.1 |
| 2007/0182192 A1 * | 8/2007 | Meyers | ............. | B62D 33/0273 296/50 |
| 2007/0183877 A1 * | 8/2007 | Lambright | .............. | B60P 1/438 414/469 |
| 2007/0262602 A1 * | 11/2007 | Nagle | ....................... | B60P 3/07 296/51 |
| 2013/0028693 A1 * | 1/2013 | Justak | .................... | B65G 69/30 414/480 |
| 2013/0094930 A1 * | 4/2013 | Kalergis | .................... | B60P 1/43 414/523 |
| 2016/0031353 A1 * | 2/2016 | DeSimone | .............. | B60P 1/435 296/57.1 |
| 2016/0137118 A1 * | 5/2016 | Piacentino | ............. | B60P 1/435 414/518 |

* cited by examiner

*Primary Examiner* — Michael McCullough
*Assistant Examiner* — Ashley Romano
(74) *Attorney, Agent, or Firm* — Dave Alan Lingbeck

(57) ABSTRACT

A universal tailgate ramp assembly for quick ramp attachment and detachment from a tailgate for all truck types. The universal tailgate ramp assembly includes a bracket assembly adapted to latch to a tailgate of truck; a ramp support assembly adjustably and removably fastened to the bracket assembly; and a ramp assembly removably mounted to the ramp support assembly for moving an object onto a box of the truck.

3 Claims, 3 Drawing Sheets

UNIVERSAL TAILGATE RAMP ASSEMBLY

BACKGROUND OF THE INVENTION

Field of the Invention

The present invention relates to truck ramps and more particularly pertains to a new universal tailgate ramp assembly for quick ramp attachment and detachment from a tailgate for all truck types.

Description of the Prior Art

The use of truck ramps is known in the prior art. More specifically, truck ramps heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a frame having an internal space and apparatus for pivotally mounting the frame on the vehicle. Ramp pivot apparatus mounted to the frame. At least one ramp member has at least two telescoping members having extended and retracted configurations. Another prior art includes a tailgate with the upper margin of the hollow/tailgate provided with at least one elongated slot extending along the upper margin from which a loading ramp structure consisting of at least three telescopically engaged ramp sections may be extended and disposed at a rearwardly and downwardly inclined position when the tailgate is in its horizontally rearwardly projecting position. Also another prior art includes a loading device to be fixedly secured to the bed of a pick-up truck. which includes a pair of transversely spaced parallel slideways within a rectangular metal frame. Further another prior art includes first, second, third and fourth generally rectangular frame members, the first and second of which are slidably coupled together to move between a nested or collapsed position and an extended position, and a third and fourth of which are likewise slidably coupled together to move between a nested or collapsed position and an extended position. While these devices fulfill their respective, particular objectives and requirements, the aforementioned patents do not disclose a new universal tailgate ramp assembly.

SUMMARY OF THE INVENTION

The general purpose of the present invention, which will be described subsequently in greater detail, is to provide a new universal tailgate ramp assembly which has many of the advantages of the truck ramps mentioned heretofore and many novel features that result in a new universal tailgate ramp assembly which is not anticipated, rendered obvious, suggested, or even implied by any of the prior art truck ramps, either alone or in any combination thereof. The present invention includes a bracket assembly adapted to latch to a tailgate of truck; a ramp support assembly adjustably and removably fastened to the bracket assembly; and a ramp assembly removably mounted to the ramp support assembly for moving an object onto a box of the truck. None of the prior art includes the combination of the elements of the present invention.

There has been thus been outlined, rather broadly, the more important features of the universal tailgate ramp assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new universal tailgate ramp assembly which has many of the advantages of the truck ramps mentioned heretofore and many novel features that result in a new universal tailgate ramp assembly which is not anticipated, rendered obvious, suggested, or even implied by any of the prior art truck ramps, either alone or in any combination thereof.

Still another object of the present invention is to provide a new universal tailgate ramp assembly for quick ramp attachment and detachment from a tailgate for all truck types.

Still yet another object of the present invention is to provide a new universal tailgate ramp assembly that quickly connects to and disconnects from the tailgate latch.

Even still another object of the present invention is to provide a new universal tailgate ramp assembly that includes ramps that can also be easily used as running boards for a truck These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
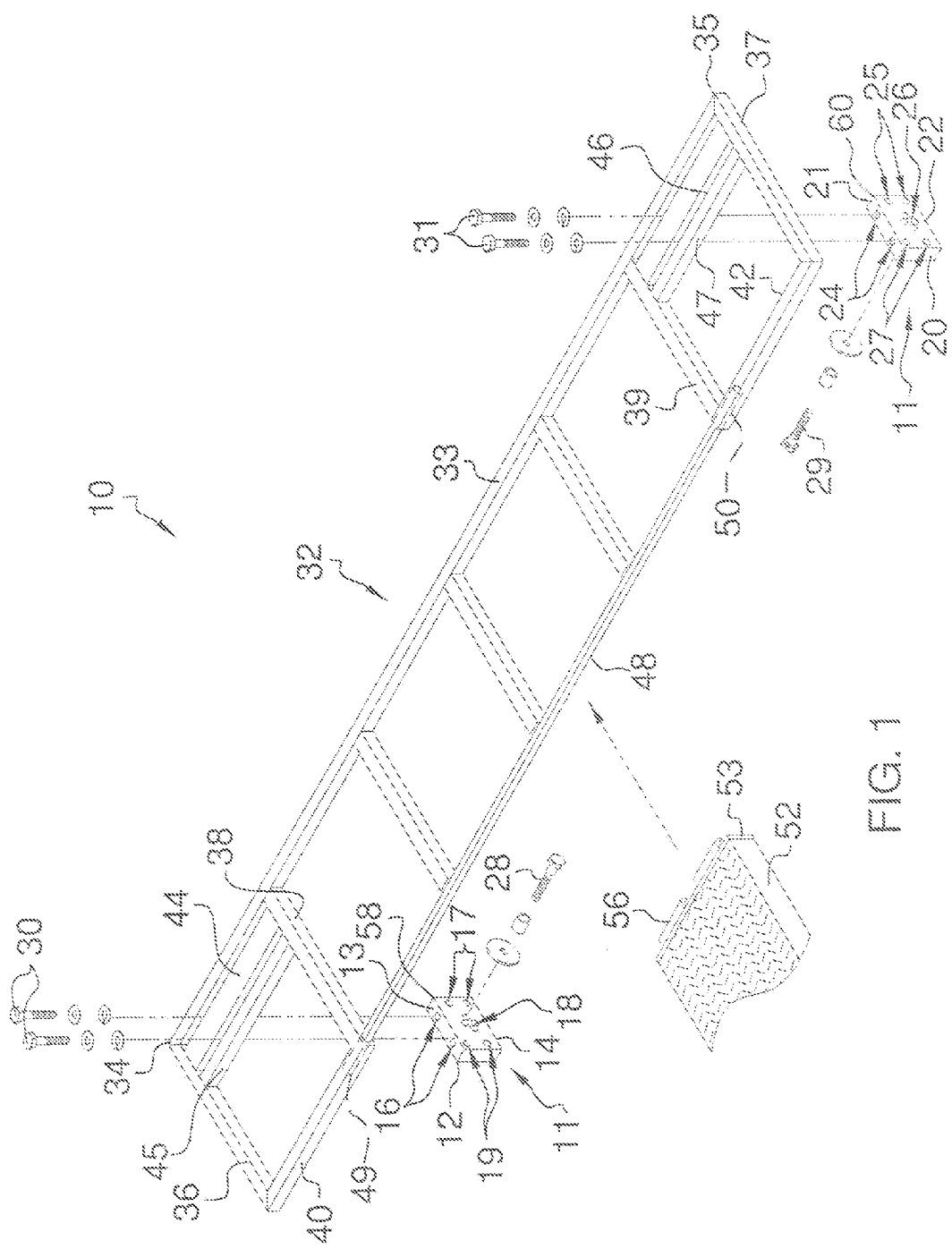
FIG. 1 is an exploded perspective view of a new universal tailgate ramp assembly according to the present invention.
Figure 2:
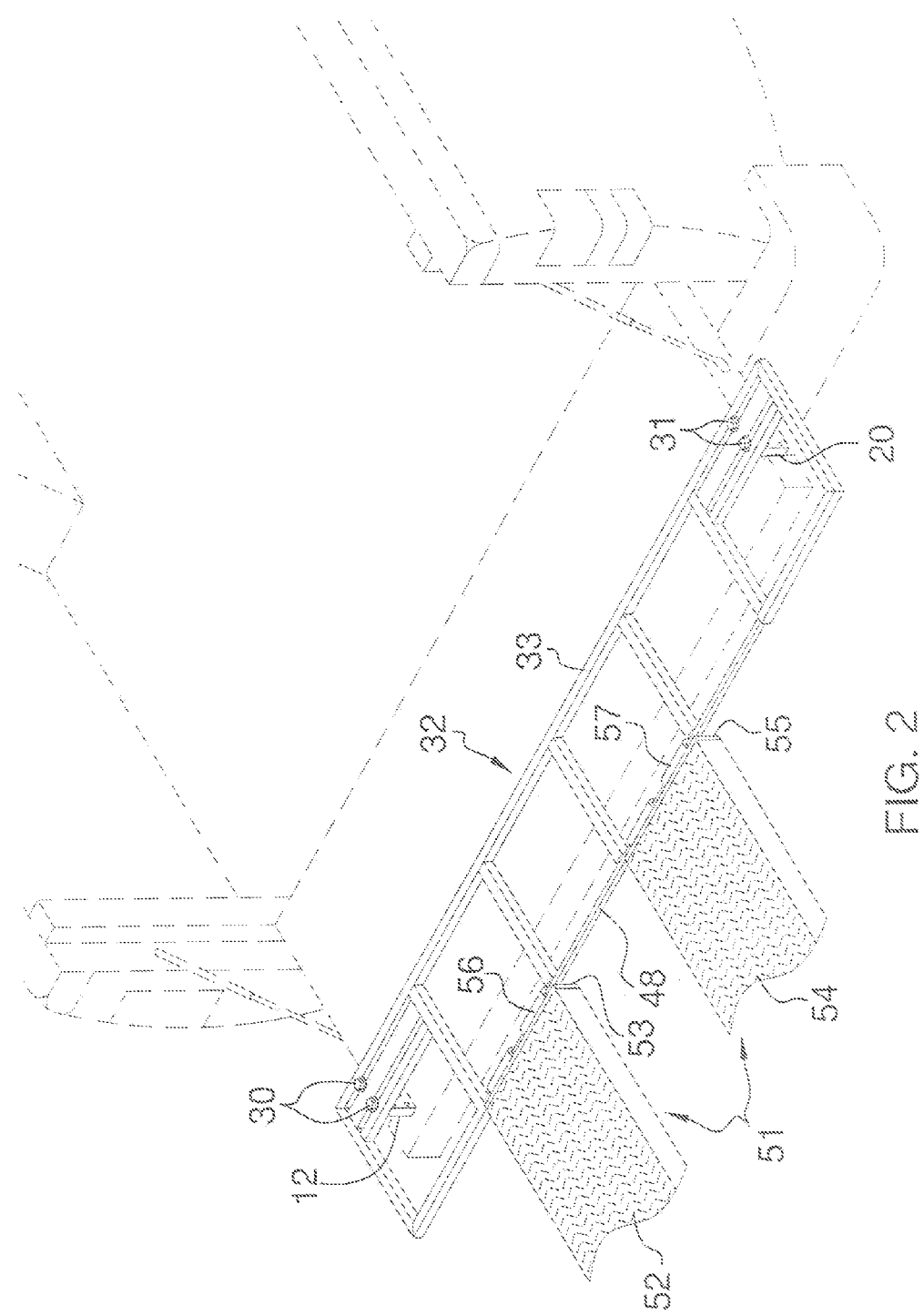
FIG. 2 is a top perspective view of the present invention mounted to the tailgate (the tailgate is shown in dashed lines with a partial view of the rear of the truck box).
Figure 3:
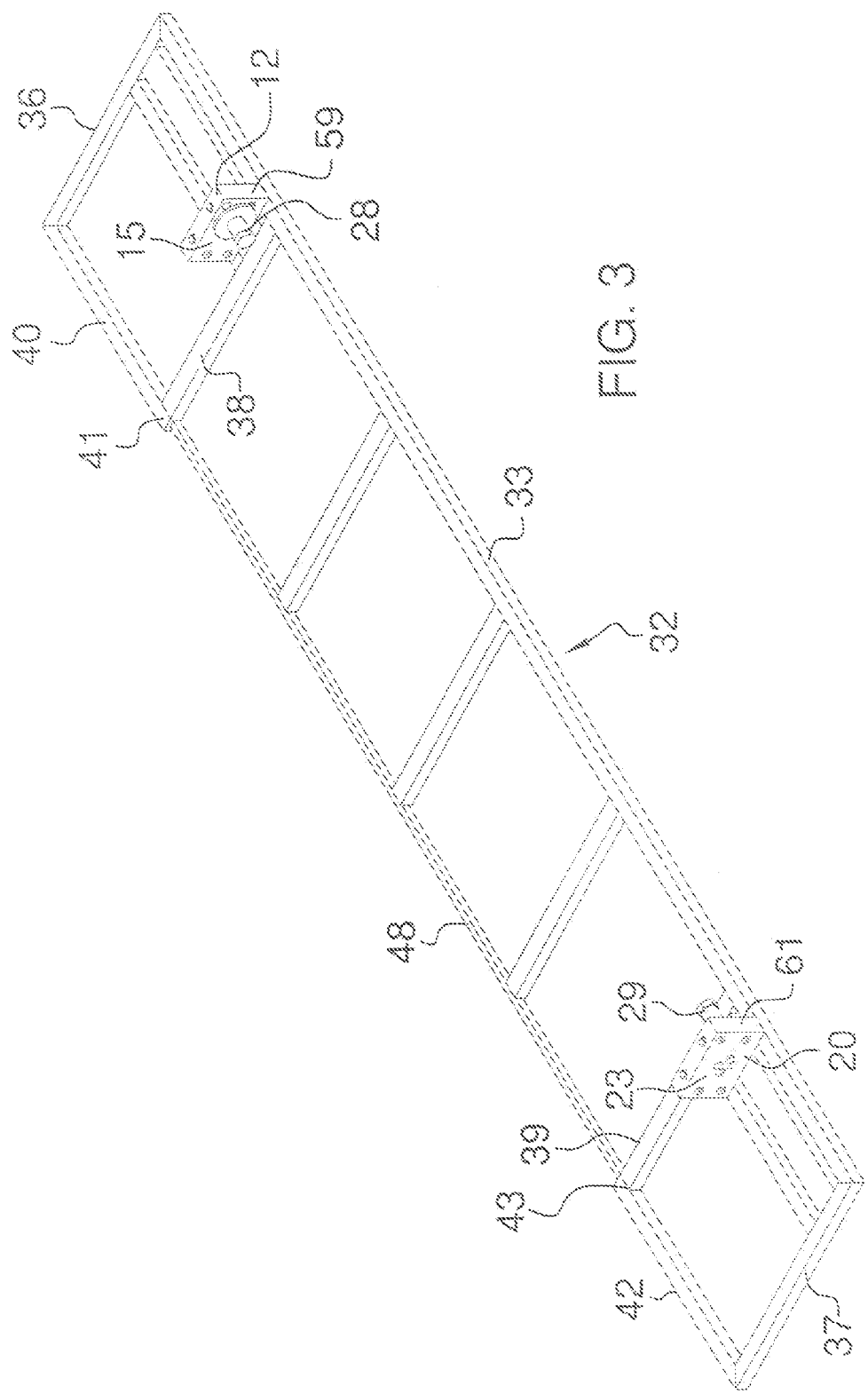
FIG. 3 is a bottom perspective view of the support and the blocks attached to the support of the present invention.

With reference now to the drawings, and in particular to FIGS. 1 through 3 thereof, a new universal tailgate ramp assembly embodying the principles and concepts of the present invention and generally designated by the reference numeral 10 will be described.

As best illustrated in FIGS. 1 through 3, the universal tailgate ramp assembly 10 may generally comprise a bracket assembly 11 adapted to securely latch to a tailgate of truck;

a ramp support assembly 32 adjustably and removably fastened to the bracket assembly 11; and a ramp assembly 51 removably mounted to the ramp support assembly 32 for moving an object onto a box of the truck.

As shown in FIGS. 1 through 3, the bracket assembly 11 may include bracket members 12,20 each adapted to latch to a respective latch of the tailgate of the truck. Each bracket member 12,20 may be a block having a planar end 13,21 and planar opposed sides 14,15,22,23, and also having a length and a width with the length being greater than the width. Each block 12,20 may have a pair of end holes 16,24 spaced apart and threaded therethrough in the end 13,21 thereof.

As illustrated in FIGS. 1 through 3, the ramp support assembly 32 may include an elongate tubular member 33 and may also include cross members 36-39 conventionally attached and welded to and spaced along the elongate tubular member 33. The cross members 36-39 may also include end cross members 36-37 each conventionally attached and welded to a respective end 34-35 of the elongate tubular member 33. The cross members 36-39 may also include a pair of intermediate cross members 38-39 each spaced from a respective end cross member 36-37. The ramp support assembly 32 may further include tubular stub members 40,42 spaced from and disposed parallel to the elongate tubular member 33. Each of tubular stub members 40,42 may be conventionally attached and welded to a respective end cross member 36-37 and a respective intermediate cross member 38-39. The ramp support assembly 32 may also include a solid elongate ramp support member 48 conventionally attached to the tubular stub members 40,42 and to one or more of the cross members 36-39 and disposed parallel to the elongate tubular member 33. The solid elongate ramp support member 48 may have end portions 49-50 each of which extends in an end 41,43 of a respective tubular stub member 40,42 for added strength. The ramp support assembly 32 may further include block mounts 44-47 conventionally interconnecting each of the end cross members 36-37 to a respective intermediate cross member 38-39. The block mounts 44-47 may be arranged in pairs with each pair of the block mounts 44-47 spaced apart and with one of the block mounts 44,46 of each pair of the block mounts 44-47 disposed proximate to and spaced parallel from the elongate tubular member 33.

As shown in FIGS. 2 and 3, the blocks 12,20 may be removably fastened to the block mounts 44-47 and to the elongate tubular member 33 and may be movable between the end cross members 36-37 and the intermediate cross members 38-39 in accordance with a length of the tailgate. The bracket assembly 11 may include fasteners 30-31 engagably disposed between the elongate tubular member 33 and the block mounts 44-47 and threaded into the top holes 16,24 in the blocks 12,20 to secure the blocks 12,20 to the ramp support assembly 32. Each of the blocks 12,20 may include a plurality of latch pin-receiving holes 17-19,25-27 threaded in the opposed sides 14-15,22-23 thereof. The latch-pin receiving holes 17-19,25-27 in each of the blocks 12,20 may include a first pair of latch-pin receiving holes 17,25 disposed proximate to a back edge 58,60 of the respective block 12,20 to accommodate particular types and sizes of tailgates for trucks, and may also include a second pair of latch-pin receiving holes 18,26 disposed proximate to a front edge 59,61 of the respective block 12,20 to accommodate other types and sizes of tailgates for trucks, and may further include a series of latch pin-receiving holes 19,27 centrally disposed in the opposed sides 14,15,22,23 to accommodate even more particular types and sizes of tailgates for trucks. The bracket assembly 11 may further include latch pins 28-29 each removably threaded in a selected one of the latch pin-receiving holes 17-19,25-27 of the respective block 12,20 to removably latch the ramp support assembly 32 and the blocks 12,20 to the tailgate.

As illustrated in FIGS. 1 through 3, the ramp assembly 51 may include one or more ramps 52,54 having one or more front end 53,55, and may also include one or more C-shaped hook members 56,57 conventionally fastened to the one or more front ends 53,55 of the one or more ramps 52,54. The elongate ramp support member 48 may be removably received in the C-shaped hook members 56-57 to support the one or more ramps 52,54 upon the ramp support assembly 32. As another embodiment, the one or more ramps 52,54 may be used as running boards for the truck by mounting the one or more ramps 52,54 to brackets depending from a frame of the truck along either the driver's or passenger's side door.

In use, the latch pins 28-29 may be coupled to the bracket assembly 11. Each of the latch pins 28-29 may be coupled to an appropriate latch pin-receiving hole 17-19,25-27 in a respective bracket member 12,20 to accommodate a particular type of tailgate. The bracket assembly 11 may be positioned and fastened to the ramp support assembly 32. The latch pins 28-29 may be latched to latches of a tailgate for a truck to secure the ramp support assembly 32 to the tailgate. The elongate ramp support member 48 may be positioned in a same plane as that of the tailgate with the elongate ramp support member 48 spaced from a top edge of the tailgate. The ramp assembly 51 may be mounted to the ramp support assembly 32 to move an object up the ramp assembly 51 into a box of the truck. The space between the tailgate and the elongate ramp support member 48 may allow the C-shaped hook members 56-57 to easily and quickly hook about the elongate ramp support member 48.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the universal tailgate ramp assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A universal tailgate ramp assembly comprising:
a bracket assembly adapted to latch to a tailgate of a truck;
a ramp support assembly adjustably and removably fastened to the bracket assembly, wherein the ramp support assembly includes an elongate tubular member and also includes cross members attached to the elongate tubular member, wherein the cross members include end cross members each attached to a respective end of the elongate tubular member, wherein the cross members also include a pair of intermediate cross members, wherein the ramp support assembly includes tubular stub members each attached to a respective said end cross member and a respective said intermediate cross member, wherein the ramp support assembly also includes a solid elongate ramp support member attached to the tubular stub members, wherein the solid elongate ramp support member has end portions each of which extends in an end of a respective said tubular stub member for added strength; and a ramp assembly removably mounted to the ramp support assembly for moving an object onto a box of the truck and adapted to also be used as running boards for the truck.

2. A universal tailgate ramp assembly comprising:

a bracket assembly adapted to latch to a tailgate of a truck and includes bracket members each adapted to latch to a respective latch of the tailgate of the truck, wherein each bracket member is a block, wherein each block has end holes in an end thereof;

a ramp support assembly adjustably and removably fastened to the bracket assembly, wherein the ramp support assembly includes an elongate tubular member and also includes cross members attached to the elongate tubular member, wherein the cross members include end cross members and a pair of intermediate cross members, wherein the ramp support assembly further includes block mounts interconnecting each of the end cross members to a respective said intermediate cross member, wherein the blocks are removably fastened to the block mounts and to the elongate tubular member and are movable between the end cross members and the intermediate cross members in accordance with a length of the tailgate, wherein the bracket assembly includes fasteners engagably disposed between the elongate tubular member and the block mounts and threaded into the end holes in the blocks; and a ramp assembly removably mounted to ramp support assembly for moving an object onto a box of the truck and adapted to also be used as running boards for the truck.

3. A universal tailgate ramp assembly comprising:

a bracket assembly adapted to latch to a tailgate of a truck;

a ramp support assembly adjustably and removably fastened to the bracket assembly, wherein the ramp support assembly includes tubular stub members and also includes a solid elongate ramp support member attached to the tubular stub members; and a ramp assembly removably mounted to the ramp support assembly for moving an object onto a box of the truck and adapted to also be used as running boards for the truck, wherein the ramp assembly includes one or more ramps having one or more front ends, and also includes one or more C-shaped hook members fastened to the one or more front ends of the one or more ramps, wherein the elongate ramp support member is removably received in the C-shaped hook members to support the one or more ramps upon the ramp support assembly.

* * * * *